(12) United States Patent
Yao

(10) Patent No.: US 7,598,305 B2
(45) Date of Patent: *Oct. 6, 2009

(54) RESIN COMPOSITION, RESIN MOLDING, PACKAGE, PRODUCTION METHOD OF RESIN MOLDING AND RECYCLING METHOD OF RESIN MOLDING

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 307 days.

This patent is subject to a terminal disclaimer.

(21) Appl. No.: 11/700,871

(22) Filed: Feb. 1, 2007

(65) Prior Publication Data

US 2008/0048365 A1 Feb. 28, 2008

(30) Foreign Application Priority Data

Aug. 23, 2006 (JP) .............................. 2006-226967

(51) Int. Cl.
*C08L 97/00* (2006.01)

(52) U.S. Cl. .......................................... 524/74; 524/72

(58) Field of Classification Search .................. 524/72, 524/74

See application file for complete search history.

(56) References Cited

U.S. PATENT DOCUMENTS

2008/0071015 A1* 3/2008 Kiuchi et al. ............... 524/261

FOREIGN PATENT DOCUMENTS

| JP | A-2002-047421 | | 2/2002 |
|----|---------------|---|--------|
| JP | 2003-268222 | * | 9/2003 |
| JP | A-2005-048067 | | 2/2005 |
| JP | A-2005-060556 | | 3/2005 |

* cited by examiner

*Primary Examiner*—Peter Szekely
(74) *Attorney, Agent, or Firm*—Oliff & Berridge, PLC

(57) ABSTRACT

A resin composition includes: an aliphatic polyester compound; and a lignophenol compound.

17 Claims, 1 Drawing Sheet

RESIN COMPOSITION, RESIN MOLDING, PACKAGE, PRODUCTION METHOD OF RESIN MOLDING AND RECYCLING METHOD OF RESIN MOLDING

CROSS-REFERENCE TO RELATED APPLICATION

This application is based on and claims priority under 35 USC 119 from Japanese Patent Application No. 2006-226967 filed Aug. 23, 2006.

BACKGROUND

1. Technical Field

The present invention relates to a resin composition, a resin molding, a package, a production method of a resin molding and a recycling method of a resin molding. More particularly, it relates to a resin composition containing a biomass material having low environmental load, a resin molding, a package, a production method of a resin molding, and a recycling method of a resin molding.

2. Related Art

Recently, biomass materials such as a biodegradable polyester resin are noted from the standpoint of environmental protection. A polylactic acid is exemplified as the representative biodegradable polyester resin.

However, the biomass material generally has low mechanical strength as compared with petroleum-based general-purpose plastics, and is further poor in heat resistance. For this reason, where a biodegradable polymer material is directly used as its molding, its application is limited to very narrow range such as applications that breakage is permissible to a certain extent, such as household garbage bags and agricultural sheets.

SUMMARY

According to an aspect of the invention, there is provided a resin composition, which includes: an aliphatic polyester compound; and a lignophenol compound.

BRIEF DESCRIPTION OF THE DRAWING

Exemplary embodiment of the present invention will be described in detail based on the following figure, wherein.

DETAILED DESCRIPTION

Figure 1:
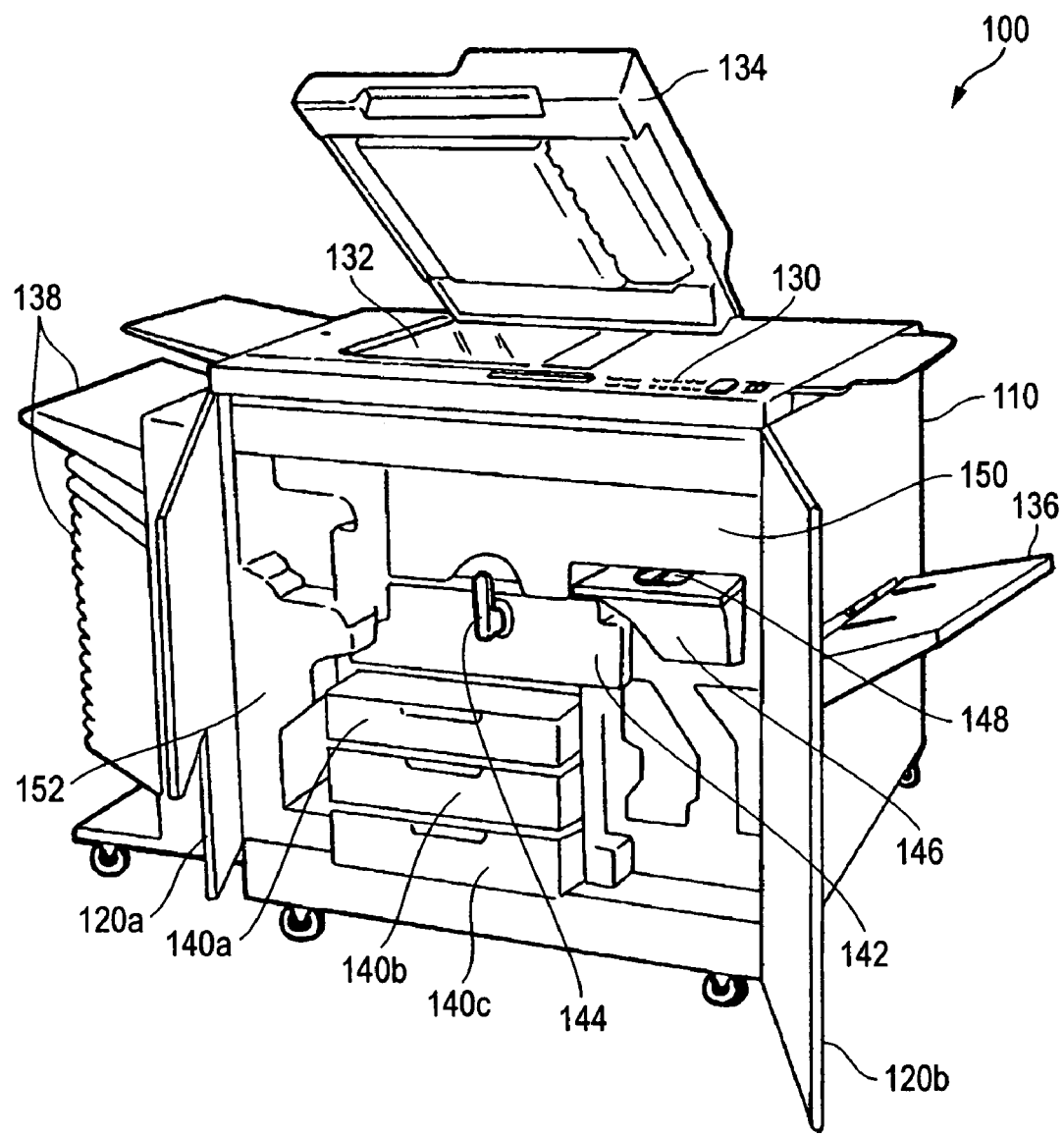
FIG. 1 is an appearance perspective view showing an image forming apparatus provided with packages and business equipment parts, according to one exemplary embodiment of the resin molding of the invention.

Preferable exemplary embodiment of the present invention is described in detail below.

(Resin Composition)

The resin composition of the present invention comprises an aliphatic polyester compound and a lignophenol compound.

Examples of the aliphatic polyester compound include a polylactic acid, a polyhydoxybutyric acid, a polybutylene succinate and a polybutylene adipate. Of those, from the point that a plant-derived latent amount is large, a polylactic acid and a polyhydroxybutyric acid are preferable, and a polylactic acid is particularly preferable.

The preferable lignophenol compound includes a compound having the structure represented by the following formula (1):

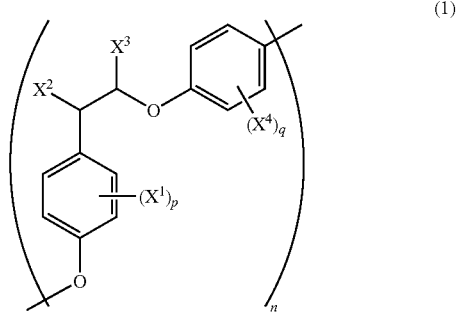

wherein $X^1$ and $X^4$ each independently represents a hydrogen atom, an alkyl group, an aryl group, an alkoxy group, an aralkyl group or a phenoxy group; $X^2$ represents a hydrogen atom, an alkyl group, an aryl group, an alkyl-substituted aryl group, an alkoxy group or a phenoxy group; $X^3$ represents an alkyl group, an aryl group, an alkyl-substituted aryl group or —$OX^5$ wherein $X^5$ represents a hydrogen atom, an alkyl group or an aryl group; $X^1$ to $X^5$ other than a hydrogen atom each may have a substituent; p and q each independently are an integer of from 1 to 4; and n is an integer of 1 or more.

Specific examples of the lignophenol compound having the structure represented by the formula (1) include the compounds (1-1) to (1-3) shown in Table 1 below.

TABLE 1

| Number | Structural formula |
|---|---|
| 1-1 | (structure shown) |
| 1-2 | (structure shown) |

TABLE 1-continued

| Number | Structural formula |
|---|---|
| 1-3 | 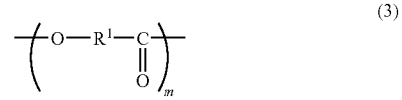 |

The resin composition of the present invention is not particularly limited so long as it comprises both the aliphatic polyester compound and the lignophenol compound, but any one of the following resin compositions (A) and (B) is preferable.

(A) A resin composition wherein the lignophenol compound is a compound having a structure represented by the following formula (2), and having an average molecular weight of from 30,000 to 200,000 in terms of a polystyrene conversion, and the aliphatic polyester compound has a structure represented by the following formula (3).

(B) A resin composition where the lignophenol compound is a compound having a structure represented by the following formula (4), and having an average molecular weight of from 200 to 3,000 in terms of a polystyrene conversion, and the aliphatic polyester compound has a structure represented by the following formula (3).

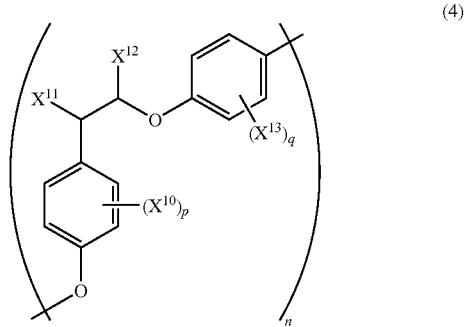
(2)

wherein $X^6$, $X^7$ and $X^9$ each independently represents a hydrogen atom, an alkoxy group, an aryl group or a phenoxy group; $X^8$ represents an alkyl group or an aryl group; $X^6$ to $X^9$ other than a hydrogen atom each may have a substituent; p and q each independently are an integer of from 1 to 4; and n is an integer of from 1 to 2,000.

$$\left(\!\!-\!\mathrm{O}\!-\!\mathrm{R}^1\!-\!\underset{\underset{\mathrm{O}}{\|}}{\mathrm{C}}\!\!-\!\right)_{\!m} \quad (3)$$

wherein $R^1$ represents a linear or branched alkylene group; and m is an integer of 1 or more.

(4)

wherein $X^{10}$ and $X^{13}$, which may have a substituent, each independently represents an alkyl group, an aryl group or an alkoxy group; $X^{11}$ and $X^{12}$ each independently represents an alkyl group, an aryl group, an alkyl-substituted aryl group or a group of an alkyl group, an aryl group or an alkyl-substituted aryl group each having a hydroxyl group, a carboxylic acid group or a carboxylic acid derivative group bonded thereto as a substituent; p and q each independently are an integer of from 1 to 4; and n is an integer of from 1 to 10.

Specific examples of the lignophenol compound represented by the formula (2), contained in the resin composition (A) include the following compounds (2-1) and (2-2) shown in Table 2 below. Further, specific examples of the aliphatic polyester compound having the structure represented by the formula (3) include the following compounds (3-1) and (3-2) shown in Table 2 below.

TABLE 2

| Number | Structural formula |
|---|---|
| 2-1 | 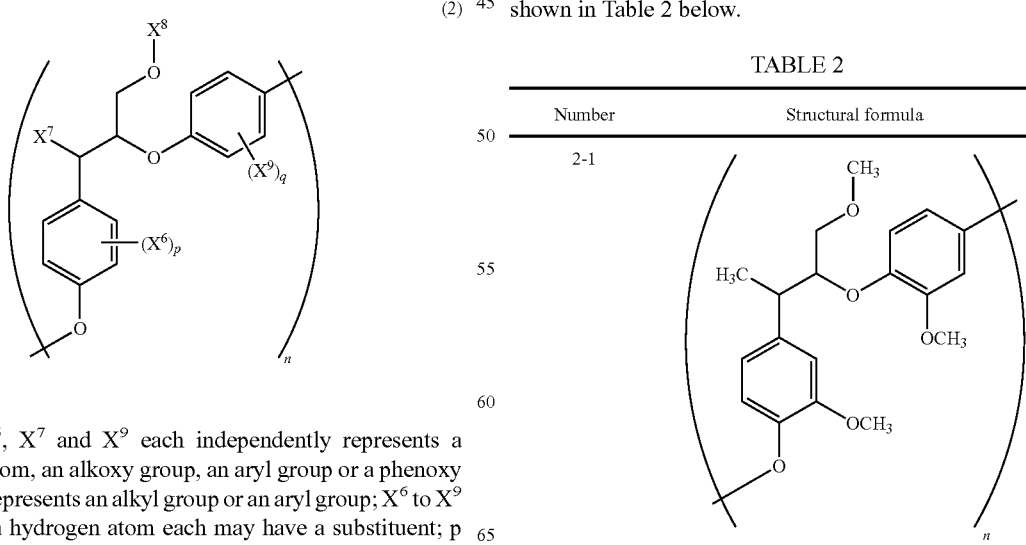 |

TABLE 2-continued

| Number | Structural formula |
|---|---|
| 2-2 | (structure with phenyl, phenoxy, OCH₃ groups)$_n$ |
| 3-1 | $\left(\!-\!O\!-\!\underset{\underset{\text{CH}_3}{|}}{\text{CH}}\!-\!\underset{\underset{\text{O}}{\|}}{\text{C}}\!-\!\right)_m$ |
| 3-2 | $\left(\!-\!O\!-\!\underset{\underset{\text{CH}_3}{|}}{\text{CH}}\!-\!\text{CH}_2\!-\!\underset{\underset{\text{O}}{\|}}{\text{C}}\!-\!\right)_m$ |

In the resin composition (A), the weigh average molecular weight in terms of a polystyrene conversion of the lignophenol is from 30,000 to 200,000 as described before, and preferably from 50,000 to 150,000. Where the weight average molecular weight is less than 30,000, there is the tendency that crystallization accelerating effect of the resin molding is insufficient, and where the weight average molecular weight exceeds 200,000, there is the tendency that compatibility with the aliphatic polyester compound decreases.

Further, in the resin composition (A), $Mw_a/Mw_b$ is preferably from 0.1 to 50, more preferably from 0.5 to 50, and particularly preferably from 1 to 30, when weight average molecular weights of the lignophenol compound and the aliphatic polyester compound in terms of a polystyrene conversion are $Mw_a$ and $Mw_b$, respectively. Where the $Mw_a/Mw_b$ is less than 0.1, there is the tendency that crystallization accelerating effect of the resin molding is insufficient, and where the $Mw_a/Mw_b$ exceeds 50, there is the tendency that compatibility with the aliphatic polyester compound decreases.

Further, in the resin composition (A), the contents of the lignophenol compound and the aliphatic polyester compound are not particularly limited, but the content of the lignophenol compound is preferably from 1 to 99 parts by mass, and more preferably from 5 to 90 parts by mass, per 100 parts by mass of the aliphatic polyester compound. Where the content of the lignophenol compound is less than the above lower limit, there is the tendency that mechanical strength, heat resistance and flame retardancy deteriorate, and where it exceeds the above upper limit, there is the tendency that fluidity when molding deteriorates.

Specific examples of the lignophenol compound having the structure represented by the formula (4), contained in the resin composition (B) include compounds (4-1), (4-2) and (4-3) shown in Table 3 below. Specific examples of the aliphatic polyester compound having the structure represented by the formula (3), contained in the resin composition (B) include compounds (3-1) and (3-2) shown in Table 2 above.

TABLE 3

| Number | Structural formula |
|---|---|
| 4-1 | (structure with OH, OH, OH, OCH₃, OCH₃ groups)$_n$ |
| 4-2 | (structure with COOH, COOH, OH, OCH₃, OCH₃ groups)$_n$ |
| 4-3 | (structure with COOH, OH, OCH₃, OCH₃, OCH₃ groups)$_n$ |

In the resin composition (B), the weight average molecular weight of the lignophenol compound is from 200 to 3,000 as described before, and preferably from 500 to 2,000, in terms of a polystyrene conversion. Where the weight average molecular weight is less than 200, crosslinking density becomes dense, and there is the tendency that the resin molding obtained is hard and brittle. On the other hand, where the weight average molecular weight exceeds 3,000, the effect as a plasticizer is lost, and there is the tendency that impact strength and cell tap strength deteriorate.

Further, in the resin composition (B), $Mw_c/Mw_b$ is preferably from 0.001 to 0.1, and particularly preferably from 0.01 to 0.07, when weight average molecular weights of the lignophenol compound and the aliphatic polyester compound in terms of a polystyrene conversion are $Mw_c$ and $Mw_b$, respectively. Where the $Mw_c/Mw_b$ is less than 0.001, crosslinking density becomes dense, and there is the tendency that the resin molding obtained is hard and brittle. On the other hand, where the $Mw_c/Mw_b$ exceeds 0.1, the effect as a plasticizer is lost, and there is the tendency that impact strength and cell tap strength deteriorate.

Further, in the resin composition (B), it is preferable that a chemical bond is formed between the lignophenol compound and the aliphatic polyester compound. When such a chemical bond is formed, there is the tendency that impact strength is further improved by crosslinking effect and uniform dispersion effect.

Examples of the chemical bond formed between the lignophenol compound and the aliphatic polyester compound include an ester bond and an ether bond. Examples where the chemical bond is an ester bond include copolymers obtained by reacting the lignophenol compound represented by the following formula (4-a) and the aliphatic polyester compound represented by the following formula (3-a).

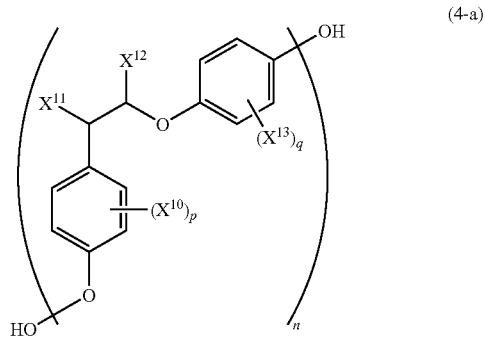

(4-a)

wherein $X^{10}$, $X^{11}$, $X^{12}$, $X^{13}$, n, p and q are the same as defined before.

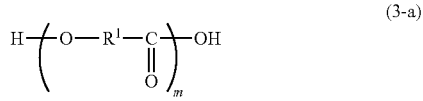

(3-a)

wherein $R^1$ and m are the same as defined before.

In the resin composition (B), the contents of the lignophenol compound and the aliphatic polyester compound are not particularly limited, but mass ratio (Ma/Mb) of those compounds is preferably from 0.5/99.5 to 30/70, and particularly preferably from 1/99 to 20/80, when mass of the lignophenol compound is Ma and mass of the aliphatic polyester compound is Mb. Where the proportion of the lignophenol compound to the sum of mass of those compounds is less than 0.5 mass %, effects as a plasticizer and a crosslinking agent become small, and there is the tendency that the effect of improving impact strength and cell tap strength deteriorates. On the other hand, where the proportion of the lignophenol compound to the sum of mass of those compounds exceeds 30 mass %, there is the tendency that impact strength and cell tap strength deteriorate from the reasons, for example, that crosslinking proceeds excessively, proportion of low molecular weight materials increases and compatibility deteriorates.

The resin composition of the present invention has excellent flame retardancy, and to further improve its flame retardancy, it is preferable to further contain a flame retardant. In particular, where the resin composition of the present invention is used as a material of a resin molding constituting home electrical appliances and business equipments, the resin molding obtained is required to have extremely high flame retardancy. Although level of flame retardancy required varies depending of products, flame retardancy corresponding to V-2 or more in UL94 standard is generally required. The resin composition of the present invention can further surely achieve flame retardancy in a high level by adding a flame retardant.

Examples of the flame retardant include bromine flame retardants, phosphor flame retardants, silicone flame retardants and inorganic particle flame retardants. Of those flame retardants, the bromine flame retardants have excellent flame retardant effect, but have the possibility that toxic gas is generated when burning. Therefore, phosphor flame retardants, silicone flame retardants and inorganic particle flame retardants are preferable from the point of reduction in environmental load.

Specific examples of the flame retardant that is preferably used in the present invention include phosphor flame retardants such as phosphoric acid ester type, condensed phosphoric acid type and phosphor polymerized polyester type; silicone flame retardants such as silicone powder and silicone resin; and inorganic particle flame retardants such as aluminum hydroxide and magnesium hydroxide.

The content of the flame retardant is preferably from 1 to 30 mass %, and more preferably from 5 to 15 mass %, based on the mass of the entire resin composition.

The resin composition of this embodiment can further contain other additives, and examples thereof include antioxidants, reinforcing agents, compatibilizers, weather-resistant agents, hydrolysis inhibitors and catalysts. The content of those additives is not particularly limited so long as it is in a range that does not impair the effect of the present invention. The content is preferably 10 mass % or less based on the mass of the entire resin composition.

The resin composition of the present invention as described above makes it possible to obtain a resin molding having sufficiently high biomass content and sufficiently high mechanical strength and heat resistance, and further having high flame retardancy, oxidation resistance, weather resistance and recycling efficiency. Additionally, when the resin composition contains a flame retardant, improvement effect of flame retardancy by the addition thereof can be obtained in a high level. The resin composition of the present invention having excellent properties as above can be applied to wide applications. For example, the resin composition is suitable as a material of a resin molding constituting packages and various parts of home electrical appliances, containers and business equipments.

(Resin Molding and its Production Method)

The resin molding and its production method of the present invention are described below.

The resin molding of the present invention is obtained by molding the resin composition of the present invention. The production method of the resin molding of the present invention is not particularly limited. Examples of the production method that can be used include injection molding, injection compression molding, extrusion molding, blow molding, calender molding, coating, casting and immersion coating. Of those, injection molding having high crystallization accelerating effect of a molding is most preferable in a combination with the resin material of the present invention.

In the production method of the resin molding of the present invention, it is preferable to sufficiently mix the resin composition before molding the resin composition. Mixing the resin composition may be conducted by mixing raw materials of the resin composition, such as the lignophenol and the polyester as described before, with a mechanical method such as kneading, may be conducted by mixing the raw materials under dissolution in an organic solvent, may be conducted by a method of mixing a biomass material in an organic solvent, and mixing a lignophenol in water by selecting a water-soluble unit thereof, thereby conducting an interfacial reaction, or may be conducted by emulsifying and then mixing the raw materials. Above all, when a metal oxide or an alkali metal hydroxide is added and mixed by twin-screw kneading at a temperature of from 100 to less than 200° C., functional groups of a biomass material are reacted with functional groups of a lignophenol, thereby forming pseudo, mutually penetrated polymer network (IPN). As a result, heat resistance and impact resistance are improved, forming the state that hydroxyl groups of the lignophenol are reacted, and consequently, oxidation resistance is extremely increased. Therefore, this is particularly preferable. Further, the lignophenol compound and the aliphatic polyester compound of the present invention have extremely high compatibility in the vicinity of a molding temperature (from 180 to 200° C.) of those. Therefore, it is possible to separately introduce each material into a molding machine, and to conduct molding with one step while kneading in an injection molding machine. Further, the lignophenol compound and the aliphatic polyester compound form a molding having extremely high impact strength by a reactive processing action that induces a chemical reaction in the molding machine, and this chemical reaction is reversibly repeated. Therefore, impact strength does not deteriorate even though repeating grinding and re-injection molding, and thus the recycling efficiency is extremely excellent.

Where the resin molding of the present invention is produced by injection molding, the resin composition of the present invention or the constituent materials thereof may be introduced into an injection molding machine in a form of a palletized compound. However, it is preferable to kneading the lignophenol compound, the aliphatic polyester compound and additives such as a flame retardant added if necessary, and injection molding the resulting mixture as it is. Even in the case of not passing through the compounding step, by using the lignophenol compound and the aliphatic polyester compound in combination, a resin molding having sufficiently high biomass content and sufficiently high mechanical strength and heat resistance, and further having high flame retardancy, oxidation resistance, weather resistance and recycling efficiency can be produced surely.

Molding conditions are not particularly limited so long as the effect according to the present invention is obtained. For example, in the case of injection molding, it is preferable that an injection temperature is from 160 to 250° C., a mold temperature is from 20 to 140° C., and a cooling time is from 10 to 120 seconds.

The resin molding of the present invention thus obtained can be applied to wide applications. Specific applications of the resin molding of the present include electrical and electronic parts and their packages, automobile parts, building materials such as wall papers and exterior materials, table wares, sheets, buffer materials and fibers. Above all, the resin molding is suitable to parts and packages of business equipments that require high impact strength and excellent hydrolysis resistance, are used in a large amount and have excellent low environmental load effect. The term "package" used herein means packages of home electrical appliances, containers, business equipments and the like, and in particular, packages of business equipments are suitable because of requiring excellent weather resistance.

(Package)

The whole of the package of the present invention may be constituted of the resin molding of the present invention. However, where the part requiring the performance such as face impact strength is constituted of the resin molding of the present invention, other part may be constituted of a resin molding other than the resin molding of the present invention. Specifically, it is preferable that a front cover, a rear cover, a paper feeding tray, a paper receiving tray, a platen and the like in a casing of a printer, a copying machine, a fax machine and the like may be constituted of the resin molding of the present invention. On the other hand, an interior cover, a toner cartridge, a process cartridge and the like may be constituted of any one of the resin molding of the present invention or other resin molding.

FIG. 1 is an appearance perspective view of an image forming apparatus provided with packages and business equipment parts, according to one exemplary embodiment of the resin molding of the invention, viewed from the front side thereof. The image forming apparatus 100 of FIG. 1 is provided with front covers 120a and 120b in front of a main body 110. Those front covers 120a and 120b are openable and closable such that a user can access in the apparatus. By this, the user can replenish a toner when the toner is consumed, can exchange a consumed process cartridge, and can remove clogged papers when jamming occurs in the apparatus. FIG. 1 shows the apparatus in the state that the front covers 120a and 120b are opened.

An operation panel 130 by which various conditions relating to image formation, such as a paper size and the number of copies, are input by the user, and a copy glass 132 on which an original copy to be read off is placed are provided on the upper surface of the main body 110. Further, the main body 110 is provided with, on the upper portion thereof, an automatic original copy carrier device that can automatically carry the original copy on the copy glass 134. Further, the main body 110 is provided with an image scanning device that obtains image data showing an image on the original copy by scanning the image on the original copy placed on the copy glass 132. The image data obtained by the image scanning device are sent to an image forming unit through a control part. The image scanning device and the control part are housed in the package 150 constituting a part of the main body 110. The image forming unit is provided in the package 150 as a detachable and attachable process cartridge 142. The process cartridge 142 can be detached and attached by turning an operation lever 144.

The package 150 of the main body 110 is provided with a toner storage part 146, and a toner can be replenished from a toner supply port 148. The toner stored in the toner storage part 146 is supplied to a development device.

On the other hand, the main body 110 is provided with paper storage cassette 140a, 140b and 140c on the bottom part thereof. Further, plural delivery rollers constituted of a pair of rollers are arranged in the main body 110, so that a delivery passage is formed such that papers in the paper storage cassette is delivered to the image forming unit located at the upper part. Paper in each paper storage cassette is taken out every one paper by a paper takeoff mechanism arranged in the vicinity of the edge of the delivery passage, and is sent to the delivery passage. A manual paper tray 136 is provided at the side of the main body 110, and the paper can be supplied from this.

The paper having an image formed thereon by the image forming unit is successively transferred between two fixing rolls mutually contacted, supported by the package 152 constituting a part of the main body 110, and then discharged to the outside of the main body 110. The main body 110 is provided with a plurality of discharge trays 138 at the side opposite the side at which the paper tray 136 is provided, and papers after image formation are discharged to those trays.

In the image forming apparatus 100, the front covers 120a and 120b receive much load such as stress and shock when opening and closing, vibration when image forming, and heat generated in the image forming apparatus. The process cartridge 142 receives much load such as shock when removing, vibration when image forming, and heat generated in the image forming apparatus. The package 150 and the package 152 receive much load such as vibration when image forming, and heat generated in the image forming apparatus. For this reason, the resin molding of the present invention is suitably used as the front covers 120a and 120b, the exterior of the process cartridge 142, the package 150 and the package 152 of the image forming apparatus 100.

(Recycling Method of Resin Molding)

The recycling method of the resin molding of the present invention comprises grinding a resin molding formed by the resin composition of the present invention, and injection molding the ground resin molding as it is.

Thus, use of the resin molding having excellent recycling efficiency of the present invention can sufficiently suppress decrease in properties such as impact strength of a fresh resin molding obtained. In the recycling method of the resin molding of the present invention, the resin molding is merely ground, and the ground material is directly subjected to injection molding, and a treating step such as removal of specific components from the resin molding is not essential. Therefore, the recycling method is useful in the points of ease and cost.

The molding conditions are the same as in the case of the production method of the resin molding of the present invention as described before, and the description thereof is omitted to avoid overlapping.

EXAMPLES

The present invention is described in further detail based on the following Examples and Comparative Examples, but it should be understood that the invention is not construed as being limited to the Examples.

Example 1

60 parts by mass of a polylactic acid (trade name "Lacea H-100", a product of Mitsui Chemicals, Inc., weight average molecular weight: 90,000 (polystyrene conversion)), 30 parts by mass of the lignophenol compound (1-1) shown in Table 1 (weight average molecular weight: 1,200 (polystyrene conversion)), 10 parts by mass of a condensed phosphoric acid ester (trade name "PX-201", a product of Daihachi Chemical Industry Co., Ltd.) and 0.5 part by mass of zinc oxide are introduced into a twin-screw kneading apparatus (laboplast Mill, a product of Toyo Seiki Seisaku-Sho, Ltd.), and kneaded at 170° C. to obtain a resin composition.

The resin composition obtained is introduced into an injection molding machine (trade name "EX50", a product of Nissei Plastic Industrial Co., Ltd.), and injection molded at an injection temperature of 200° C. and a mold temperature of 80° C. to obtain an ISO versatile dumbbell test piece (ISO-179) and a test piece for ISO deflection temperature under load (ISO-360).

The ISO dumbbell test piece is processed, and its Charpy impact strength is measured with a digital impact tester (trade name "DB-C", a product of Toyo Seiki Co., Ltd.). Further, the deflection temperature under load is measured using the test piece for ISO deflection temperature under load (HDT standard model, Toyo Seiki Co., Ltd.). Further, using the ISO versatile dumbbell test piece, abrasion resistance is measured as weight loss of Taber abrasion (500 g, 500 times; JIS K7204), and surface hardness (ISO D-785) is measured with Rockwell hardness tester (trade name "ARD-A", a product of Akashi Seisakusho). The results obtained are shown in Table 4 below.

Example 2

A resin composition is prepared in the same manner as in Example 1, except that the amount of the polylactic acid is changed from 60 parts by mass to 90 parts by mass, the amount of the lignophenol compound (1-1) is changed from 30 parts by mass to 5 parts by mass, and the amount of the condensed phosphoric acid ester is changed from 10 parts by mass to 5 parts by mass. Using the resin composition obtained, an ISO versatile dumbbell test piece and a test piece for ISO deflection temperature under load are prepared, and Charpy impact strength, deflection temperature under load, abrasion resistance and surface hardness are measured in the same manner as in Example 1. The results obtained are shown in Table 4 below.

Example 3

A resin composition is prepared in the same manner as in Example 1, except that the amount of the polylactic acid is changed from 60 parts by mass to 20 parts by mass, and the amount of the lignophenol compound (1-1) is changed from 30 parts by mass to 70 parts by mass. Using the resin composition obtained, an ISO versatile dumbbell test piece and a test piece for ISO deflection temperature under load are prepared, and Charpy impact strength, deflection temperature under load, abrasion resistance and surface hardness are measured in the same manner as in Example 1. The results obtained are shown in Table 4 below.

Example 4

A resin composition is prepared in the same manner as in Example 1, except that the lignophenol compound (1-2) (weight average molecular weight: 2,500 (polystyrene conversion)) in Table 1 is used in place of the lignophenol compound (1-1). Using the resin composition obtained, an ISO versatile dumbbell test piece and a test piece for ISO deflection temperature under load are prepared, and Charpy impact strength, deflection temperature under load, abrasion resistance and surface hardness are measured in the same manner as in Example 1. The results obtained are shown in Table 4 below.

Example 5

A resin composition is prepared in the same manner as in Example 1, except that the lignophenol compound (1-3) (weight average molecular weight: 800 (polystyrene conversion)) in Table 1 is used in place of the lignophenol compound (1-1). Using the resin composition obtained, an ISO versatile dumbbell test piece and a test piece for ISO deflection temperature under load are prepared, and Charpy impact strength, deflection temperature under load, abrasion resistance and surface hardness are measured in the same manner as in Example 1. The results obtained are shown in Table 4 below.

Example 6

A resin composition is prepared in the same manner as in Example 1, except that a poly-3-hydroxybutyric acid (weight average molecular weight: 45,000 (polystyrene conversion)) is used in place of the polylactic acid. Using the resin composition obtained, an ISO versatile dumbbell test piece and a test piece for ISO deflection temperature under load are prepared, and Charpy impact strength, deflection temperature under load, abrasion resistance and surface hardness are measured in the same manner as in Example 1. The results obtained are shown in Table 4 below.

Comparative Example 1

A resin composition is prepared in the same manner as in Example 1, except that a mixture of 30 parts by mass of a polylactic acid, 30 parts by mass of a polycarbonate and 30 parts by mass of a phosphoric acid ester (trade name "CR-741", a product of Daihachi Chemical Industry Co., Ltd.) is used as a molding material. Using the resin composition obtained, an ISO versatile dumbbell test piece and a test piece for ISO deflection temperature under load are prepared, and Charpy impact strength, deflection temperature under load, abrasion resistance and surface hardness are measured in the same manner as in Example 1. The results obtained are shown in Table 4 below.

Comparative Example 2

A resin composition is prepared in the same manner as in Example 1, except that a mixture of 50 parts by mass of a polylactic acid, 30 parts by mass of nanoclay and 20 parts by mass of phosphoric acid ester (trade name "CR-741", a product of Daihachi Chemical Industry Co., Ltd.) is used as a molding material. Using the resin composition obtained, an ISO versatile dumbbell test piece and a test piece for ISO deflection temperature under load are prepared, and Charpy impact strength, deflection temperature under load, abrasion resistance and surface hardness are measured in the same manner as in Example 1. The results obtained are shown in Table 4 below.

TABLE 4

|   | Charpy impact strength (kJ/m$^2$) | Deflection temperature under load (° C.) | Taber abrasion (%) | Rockwell hardness (R/M) |
| --- | --- | --- | --- | --- |
| Example 1 | 4.5 | 145 | 0.05 | 123/69 |
| Example 2 | 4.0 | 118 | 0.08 | 118/66 |
| Example 3 | 5.4 | 156 | 0.02 | 140/78 |
| Example 4 | 5.2 | 140 | 0.07 | 120/66 |
| Example 5 | 4.0 | 138 | 0.06 | 122/65 |
| Example 6 | 4.2 | 155 | 0.05 | 124/66 |
| Comparative Example 1 | 1.5 | 78 | 1.05 | 85/58 |
| Comparative Example 2 | 0.7 | 60 | 1.88 | 89/57 |

As shown in Table 4, it is confirmed that the resin moldings of Examples 1 to 6 have high impact strength, heat resistance, abrasion resistance and surface hardness.

Examples 7 to 12

Resin compositions prepared in the same manners as in Examples 1 to 6 are injection molded under the same conditions to prepare front covers of a color multifunction machine (DocuCenter 500, a product of Fuji Xerox Co., Ltd.). Weather resistance of each of the front covers is measured by allowing the front cover to stand for 1,000 hours with a weatherometer (a product of Toyo Seiki Co., Ltd.), and measuring color difference ΔE before and after allowing to stand with a calorimeter (Color Guide 45/0, a product of Gardner). Further, face impact strength of the front cover is measured (Sheet Impact Tester H-100, a product of Toyo Seiki Co., Ltd.). The results obtained are shown in Table 5 below.

Comparative Examples 3 and 4

Front covers are prepared in the same manner as in Examples 7 to 12, except for using the resin compositions prepared in the same manner as in Comparative Examples 1 and 2, and color difference ΔE and face impact strength are measured. The results obtained are shown in Table 5 below.

TABLE 5

|   | Color difference ΔE | Face impact strength (J) |
| --- | --- | --- |
| Example 7 | 0.04 | 120 |
| Example 8 | 0.08 | 90 |
| Example 9 | 0.03 | 145 |
| Example 10 | 0.05 | 108 |
| Example 11 | 0.04 | 112 |
| Example 12 | 0.06 | 125 |
| Comparative Example 3 | 0.38 | 46 |
| Comparative Example 4 | 0.32 | 20 |

As shown in Table 5, it is confirmed that the front covers obtained in Examples 7 to 12 have high oxidation resistance and face impact strength as compared with the front covers obtained in Comparative Examples 3 and 4.

Example 13

4 parts by mass of the lignophenol compound having the structure represented by the formula (2-1) in Table 2 and having a weight average molecular weight of 98,000 in terms of a polystyrene conversion, and 10 parts by weight of the aliphatic polyester compound (3-1) in Table 2 (weight average molecular weight: 140,000 (polystyrene conversion)) are introduced into an injection molding machine (trade name "EX-50", a product of Nissei Plastic Industrial Co., Ltd.), and injection molded under the conditions of a cylinder temperature of 180° C., a mold temperature of 110° C. and a retention time in mold of 60 seconds to obtain an ISO versatile dumbbell test piece and a UL test piece (thickness: 1.6 mm).

The ISO versatile dumbbell test piece obtained is processed into a Charpy impact test piece and is allowed to stand under temperature and moisture conditions of 65° C./85%. Charpy impact strength before and after allowing to stand is measured with a impact strength testing machine (trade name "DG-50", a product of Toyo Seiki Co., Ltd.) to evaluate maintenance of Charpy impact strength. Regarding the UL test piece, a flame retardancy test (V test and 5V test of UL94) is conducted. 1000 hours weather resistance is evaluated as a color change $\Delta E$ using a weatherometer (Ci3000+, a product of Atlas Co.), and a calorimeter (Color Guide 45/0, a product of Gardner Co.). The results obtained are shown in Table 6 below. In the column of "Flame retardancy" in Table 6, "Not" means that the flame retardancy did not reach V level in UL flame retardancy test (hereinafter the same).

Example 14

An ISO versatile dumbbell test piece and a UL test piece are prepared in the same manner as in Example 13, except that the amount of the lignophenol compound is changed from 4 parts by mass to 1 part by mass. Maintenance of Charpy impact strength, flame retardancy and weather resistance of those test pieces are evaluated in the same manner as in Example 13. The results obtained are shown in Table 6 below.

Example 15

An ISO versatile dumbbell test piece and a UL test piece are prepared in the same manner as in Example 13, except that the amount of the lignophenol compound is changed from 4 parts by mass to 20 parts by mass. Maintenance of Charpy impact strength, flame retardancy and weather resistance of those test pieces are evaluated in the same manner as in Example 13. The results obtained are shown in Table 6 below.

Example 16

An ISO versatile dumbbell test piece and a UL test piece are prepared in the same manner as in Example 13, except that the lignophenol compound having the structure represented by the formula (2-1) in Table 2 and having a weight average molecular weight of 31,500 in terms of a polystyrene conversion is used in place of the lignophenol compound used in Example 13. Maintenance of Charpy impact strength, flame retardancy and weather resistance of those test pieces are evaluated in the same manner as in Example 13. The results obtained are shown in Table 6 below.

Example 17

An ISO versatile dumbbell test piece and a UL test piece are prepared in the same manner as in Example 13, except that the lignophenol compound having the structure represented by the formula (2-1) in Table 2 and having a weight average molecular weight of 197,500 in terms of a polystyrene conversion is used in place of the lignophenol compound used in Example 13. Maintenance of Charpy impact strength, flame retardancy and weather resistance of those test pieces are evaluated in the same manner as in Example 13. The results obtained are shown in Table 6 below.

Example 18

An ISO versatile dumbbell test piece and a UL test piece are prepared in the same manner as in Example 13, except that the lignophenol compound having the structure represented by the formula (2-2) in Table 2 and having a weight average molecular weight of 92,000 in terms of a polystyrene conversion is used in place of the lignophenol compound used in Example 13. Maintenance of Charpy impact strength, flame retardancy and weather resistance of those test pieces are evaluated in the same manner as in Example 13. The results obtained are shown in Table 6 below.

Example 19

An ISO versatile dumbbell test piece and a UL test piece are prepared in the same manner as in Example 13, except that the aliphatic polyester compound having the structure represented by the formula (3-1) in Table 2 and having a weight average molecular weight of 110,000 in terms of a polystyrene conversion is used in place of the aliphatic polyester compound used in Example 13. Maintenance of Charpy impact strength, flame retardancy and weather resistance of those test pieces are evaluated in the same manner as in Example 13. The results obtained are shown in Table 6 below.

Example 20

An ISO versatile dumbbell test piece and a UL test piece are prepared in the same manner as in Example 13, except that the aliphatic polyester compound having the structure represented by the formula (3-1) in Table 2 and having a weight average molecular weight of 55,000 in terms of a polystyrene conversion is used in place of the aliphatic polyester compound used in Example 13. Maintenance of Charpy impact strength, flame retardancy and weather resistance of those test pieces are evaluated in the same manner as in Example 13. The results obtained are shown in Table 6 below.

Example 21

An ISO versatile dumbbell test piece and a UL test piece are prepared in the same manner as in Example 13, except that the aliphatic polyester compound having the structure represented by the formula (3-2) in Table 2 and having a weight average molecular weight of 75,000 in terms of a polystyrene conversion is used in place of the aliphatic polyester compound used in Example 13. Maintenance of Charpy impact strength, flame retardancy and weather resistance of those test pieces are evaluated in the same manner as in Example 13. The results obtained are shown in Table 6 below.

Example 22

An ISO versatile dumbbell test piece and a UL test piece are prepared in the same manner as in Example 13, except that 2 parts by mass of a condensed phosphoric acid ester (trade name "PX-200", a product of Daihachi Chemical Industry Co., Ltd.) are further added. Maintenance of Charpy impact strength, flame retardancy and weather resistance of those test pieces are evaluated in the same manner as in Example 13. The results obtained are shown in Table 6 below.

Example 23

An ISO versatile dumbbell test piece and a UL test piece are prepared in the same manner as in Example 13, except that 2 parts by mass of magnesium hydroxide (trade name "FRX-100", a product of Shin-Etsu Silicone Co., Ltd.) are further added. Maintenance of Charpy impact strength, flame retardancy and weather resistance of those test pieces are evaluated in the same manner as in Example 13. The results obtained are shown in Table 6 below.

Example 24

An ISO versatile dumbbell test piece and a UL test piece are prepared in the same manner as in Example 13, except that 2 parts by mass of a silicone powder (trade name "NIASIL 6200", a product of Ajinomoto Fine-Techno Co., Inc.) are further added. Maintenance of Charpy impact strength, flame retardancy and weather resistance of those test pieces are evaluated in the same manner as in Example 13. The results obtained are shown in Table 6 below.

Example 25

An ISO versatile dumbbell test piece and a UL test piece are prepared in the same manner as in Example 13, except that 4 parts by mass of the lignophenol compound and 10 parts by mass of the aliphatic polyester compound, used in Example 13 are previously kneaded in a kneading machine (Laboplast Mill, a product of Toyo Seiki Seisaku-Sho, Ltd.) to obtain a masterbatch, and the masterbatch is injection molded. Maintenance of Charpy impact strength, flame retardancy and weather resistance of those test pieces are evaluated in the same manner as in Example 13. The results obtained are shown in Table 6 below.

Example 26

An ISO versatile dumbbell test piece and a UL test piece are prepared in the same manner as in Example 13, except that the mold temperature is 50° C. Maintenance of Charpy impact strength, flame retardancy and weather resistance of those test pieces are evaluated in the same manner as in Example 13. The results obtained are shown in Table 6 below.

Comparative Example 5

An ISO versatile dumbbell test piece and a UL test piece are prepared in the same manner as in Example 13, except that in place of the lignophenol compound and the aliphatic polyester compound, used in Example 13, 10 parts by mass of a polylactic acid (trade name "Lacear H-100", a product of Mitsui Chemicals Inc.) and 1 part by mass of a carbodiimide (trade name "LA-1", a product of Nisshinbo Industries, Inc.) as a hydrolysis inhibitor are kneaded with a kneading machine (Laboplast Mill, a product of Toyo Seiki Seisaku-Sho, Ltd.) to obtain a masterbatch, and the masterbatch is injection molded. Maintenance of Charpy impact strength, flame retardancy and weather resistance of those test pieces are evaluated in the same manner as in Example 13. The results obtained are shown in Table 6 below.

Comparative Example 6

An ISO versatile dumbbell test piece and a UL test piece are prepared in the same manner as in Example 13, except that in place of the lignophenol compound and the aliphatic polyester compound, used in Example 13, the commercially available masterbatch comprising a polylactic and a nanoclay as main components (trade name "TE-8300", a product of Unitika, Ltd.) is injection molded. Maintenance of Charpy impact strength, flame retardancy and weather resistance of those test pieces are evaluated in the same manner as in Example 13. The results obtained are shown in Table 6 below.

TABLE 6

| | Maintenance of Charpy impact strength (65° C./85%) | | Flame retardancy (UL flame retardant test) | | Weather resistance (1,000 hours) |
|---|---|---|---|---|---|
| | Initial ($kJ/m^2$) | After 1,000 hours ($kJ/m^2$) | V test | 5V test | ΔE |
| Example 13 | 4.0 | 4.0 | V-2 | Not | 0.02 |
| Example 14 | 3.2 | 3.2 | V-2 | Not | 0.01 |
| Example 15 | 4.5 | 4.5 | V-2 | Not | 0.01 |
| Example 16 | 3.8 | 3.8 | V-2 | Not | 0.03 |
| Example 17 | 4.8 | 4.8 | V-2 | Not | 0.02 |
| Example 18 | 4.2 | 4.2 | V-2 | Not | 0.02 |
| Example 19 | 4.0 | 3.9 | V-2 | Not | 0.01 |
| Example 20 | 3.9 | 3.9 | V-2 | Not | 0.02 |
| Example 21 | 3.5 | 3.5 | V-2 | Not | 0.01 |
| Example 22 | 3.5 | 3.3 | V-0 | 5VB | 0.05 |
| Example 23 | 3.3 | 3.2 | V-0 | Not | 0.01 |
| Example 24 | 4.2 | 4.1 | V-0 | Not | 0.02 |
| Example 25 | 4.2 | 4.2 | V-2 | Not | 0.01 |
| Example 26 | 4.0 | 3.9 | V-2 | Not | 0.02 |
| Comparative Example 5 | 0.6 | 0.4 | Not | Not | 0.58 |
| Comparative Example 13 | 1.4 | 0.7 | Not | Not | 0.62 |

As shown in Table 6, it is confirmed that the resin moldings obtained in Examples 13 to 26 have high maintenance of impact strength, flame retardancy and weather resistance as compared with the resin moldings obtained in Comparative Examples 5 and 6.

Examples 27 to 40

Front covers of Examples 27 to 40 for a color multifunction machine (DocuCenter 500, a product of Fuji Xerox Co., Ltd.) are prepared in the same manners as in Examples 13 to 26, respectively. An ISO versatile dumbbell test piece and a UL test piece are cut off from each of the front covers obtained (the same each test piece obtained in Examples 13 to 26, except that the thickness of the test piece is 2.4 mm), and the same evaluations are conducted. Further, face impact strength of each of the front covers is measured with a face impact strength measurement device (trade name "H-100", a product of Toyo Seiki Co., Ltd.). The results obtained are shown in Table 7 below.

Comparative Examples 7 and 8

Front covers of Comparative Examples 7 and 8 for a color multifunction machine (DocuCenter 500, a product of Fuji Xerox Co., Ltd.) are prepared in the same manners as in Comparative Examples 5 and 6, respectively, and Charpy impact strength, flame retardancy, weather resistance and face impact strength are measured or evaluated in the same manners as in Examples 27 to 40. The results obtained are shown in Table 7 below.

TABLE 7

| | Maintenance of Charpy impact strength (65° C./85%) | | Flame retardancy (UL94 flame retardant test) | | Weather resistance (1,000 hours) ΔE | Face impact strength (J) |
|---|---|---|---|---|---|---|
| | Initial (kJ/m²) | After 1,000 hours (kJ/m²) | V test | 5V test | | |
| Example 27 | 3.0 | 2.9 | V-2 | Not | 0.02 | 85 |
| Example 28 | 2.5 | 2.5 | V-2 | Not | 0.02 | 78 |
| Example 29 | 3.2 | 3.2 | V-2 | Not | 0.02 | 108 |
| Example 30 | 2.9 | 2.9 | V-2 | Not | 0.03 | 79 |
| Example 31 | 3.3 | 3.2 | V-2 | Not | 0.02 | 105 |
| Example 32 | 3.1 | 3.0 | V-2 | Not | 0.03 | 88 |
| Example 33 | 2.9 | 2.8 | V-2 | Not | 0.02 | 78 |
| Example 34 | 2.9 | 2.7 | V-2 | Not | 0.02 | 76 |
| Example 35 | 2.4 | 2.4 | V-2 | Not | 0.02 | 77 |
| Example 36 | 2.5 | 2.4 | V-0 | 5VB | 0.08 | 72 |
| Example 37 | 2.3 | 2.2 | V-0 | Not | 0.03 | 69 |
| Example 38 | 3.0 | 3.0 | V-0 | Not | 0.03 | 87 |
| Example 39 | 3.2 | 3.2 | V-2 | Not | 0.01 | 88 |
| Example 40 | 2.8 | 2.7 | V-2 | Not | 0.03 | 80 |
| Comparative Example 7 | 0.6 | 0.3 | Not | Not | 0.64 | 0.5 |
| Comparative Example 8 | 0.9 | 0.6 | Not | Not | 0.68 | 18 |

As shown in Table 7, it is confirmed that the resin moldings obtained in Examples 27 to 40 have high maintenance of impact strength, flame retardancy, weather resistance and face impact strength as compared with the resin moldings obtained in Comparative Examples 7 and 8.

Example 41

1 part by mass of the lignophenol having the structure represented by the formula (4-1) in Table 3 and having a weight average molecular weight of 1,350 in terms of a polystyrene conversion, and 20 parts by mass of the aliphatic polyester compound having the structure represented by the formula (3-1) in Table 2 and having a weight average molecular weight of 120,000 in terms of a polystyrene conversion are separately introduced into an injection molding machine (trade name "EX-50", a product of Nissei Plastic Industrial Co., Ltd.), and injection molded under the conditions of a cylinder temperature of 180° C. and a mold temperature of 110° C. to prepare an ISO versatile dumbbell test piece, a disc test piece having a diameter of 60 mm and a thickness of 3 mm, a cell tap test piece having provided thereon a boss having an inner diameter of 2.5 mm and an outer diameter of 7.5 mm, and a test piece for UL94 V test (1.5 mm), respectively.

The ISO versatile test piece is processed, and Charpy impact strength thereof is measured with an impact strength testing apparatus (trade name "DG-50", a product of Toyo Seiki Co., Ltd.). Cell tap strength is measured using the cell tap test piece. Flame retardant test (V test of UL94) is conducted using the UL test piece. The results obtained are shown in Table 8 below.

Example 42

An ISO versatile dumbbell test piece, a disc test piece, a cell tap test piece, and a test piece for UL94 V test are prepared in the same manners as in Example 41, except that the amount of the aliphatic polyester compound used in Example 41 is changed from 20 parts by mass to 5 parts by mass, and measurement of Charpy impact strength and cell tap strength, and evaluation of flame retardancy are conducted in the same manners as in Example 41. The results obtained are shown in Table 8 below.

Example 43

An ISO versatile dumbbell test piece, a disc test piece, a cell tap test piece, and a test piece for UL94 V test are prepared in the same manners as in Example 41, except that the amount of the aliphatic polyester compound used in Example 41 is changed from 20 parts by mass to 100 parts by mass, and measurement of Charpy impact strength and cell tap strength, and evaluation of flame retardancy are conducted in the same manners as in Example 41. The results obtained are shown in Table 8 below.

Example 44

An ISO versatile dumbbell test piece, a disc test piece, a cell tap test piece, and a test piece for UL94 V test are prepared in the same manners as in Example 41, except that the lignophenol compound having the structure represented by the formula (4-1) in Table 3 and having a weight average molecular weight of 315 in terms of a polystyrene conversion is used in place of the lignophenol compound used in Example 41, and measurement of Charpy impact strength and cell tap strength, and evaluation of flame retardancy are conducted in the same manners as in Example 41. The results obtained are shown in Table 8 below.

Example 45

An ISO versatile dumbbell test piece, a disc test piece, a cell tap test piece, and a test piece for UL94 V test are prepared in the same manners as in Example 41, except that the lignophenol compound having the structure represented by the formula (4-1) in Table 3 and having a weight average molecular weight of 2,950 in terms of a polystyrene conversion is used in place of the lignophenol compound used in Example 41, and measurement of Charpy impact strength and cell tap strength, and evaluation of flame retardancy are conducted in the same manners as in Example 41. The results obtained are shown in Table 8 below.

Example 46

An ISO versatile dumbbell test piece, a disc test piece, a cell tap test piece, and a test piece for UL94 V test are prepared in the same manners as in Example 41, except that the lignophenol compound having the structure represented by the formula (4-2) in Table 3 and having a weight average molecular weight of 2,200 in terms of a polystyrene conversion is used in place of the lignophenol compound used in Example 41, and measurement of Charpy impact strength and cell tap strength, and evaluation of flame retardancy are conducted in the same manners as in Example 41. The results obtained are shown in Table 8 below.

Example 47

An ISO versatile dumbbell test piece, a disc test piece, a cell tap test piece, and a test piece for UL94 V test are prepared in the same manners as in Example 41, except that the lignophenol compound having the structure represented by the formula (4-3) in Table 3 and having a weight average molecular weight of 1,850 in terms of a polystyrene conversion is used in place of the lignophenol compound used in Example 41, and measurement of Charpy impact strength and cell tap strength, and evaluation of flame retardancy are conducted in the same manners as in Example 41. The results obtained are shown in Table 8 below.

Example 48

An ISO versatile dumbbell test piece, a disc test piece, a cell tap test piece, and a test piece for UL94 V test are prepared in the same manners as in Example 41, except that the aliphatic polyester compound having the structure represented by the formula (3-1) in Table 2 and having a weight average molecular weight of 30,000 in terms of a polystyrene conversion is used in place of the aliphatic polyester compound used in Example 41, and measurement of Charpy impact strength and cell tap strength, and evaluation of flame retardancy are conducted in the same manners as in Example 41. The results obtained are shown in Table 8 below.

Example 49

An ISO versatile dumbbell test piece, a disc test piece, a cell tap test piece, and a test piece for UL94 V test are prepared in the same manners as in Example 41, except that the aliphatic polyester compound having the structure represented by the formula (3-1) in Table 2 and having a weight average molecular weight of 140,000 in terms of a polystyrene conversion is used in place of the aliphatic polyester compound used in Example 41, and measurement of Charpy impact strength and cell tap strength, and evaluation of flame retardancy are conducted in the same manners as in Example 41. The results obtained are shown in Table 8 below.

Example 50

An ISO versatile dumbbell test piece, a disc test piece, a cell tap test piece, and a test piece for UL94 V test are prepared in the same manners as in Example 41, except that the aliphatic polyester compound having the structure represented by the formula (3-2) in Table 2 and having a weight average molecular weight of 75,000 in terms of a polystyrene conversion is used in place of the aliphatic polyester compound used in Example 41, and measurement of Charpy impact strength and cell tap strength, and evaluation of flame retardancy are conducted in the same manners as in Example 41. The results obtained are shown in Table 8 below.

Example 51

An ISO versatile dumbbell test piece, a disc test piece, a cell tap test piece, and a test piece for UL94 V test are prepared in the same manners as in Example 41, except that 2 parts by mass of a condensed phosphoric acid ester (trade name "PX-200", a product of Daihachi Chemical Industry Co., Ltd.) are further added, and measurement of Charpy impact strength and cell tap strength, and evaluation of flame retardancy are conducted in the same manners as in Example 41. The results obtained are shown in Table 8 below.

Example 52

An ISO versatile dumbbell test piece, a disc test piece, a cell tap test piece, and a test piece for UL94 V test are prepared in the same manners as in Example 41, except that 2 parts by mass of magnesium hydroxide (trade name "FRX-100", a product of Shin-Etsu Silicone Co., Ltd.) are further added, and measurement of Charpy impact strength and cell tap strength, and evaluation of flame retardancy are conducted in the same manners as in Example 41. The results obtained are shown in Table 8 below.

Example 53

An ISO versatile dumbbell test piece, a disc test piece, a cell tap test piece, and a test piece for UL94 V test are prepared in the same manners as in Example 41, except that 2 parts by mass of a silicone powder (trade name "NIASIL 6200", a product of Ajinomoto Techno-Fine Co., Inc.) are further added, and measurement of Charpy impact strength and cell tap strength, and evaluation of flame retardancy are conducted in the same manners as in Example 41. The results obtained are shown in Table 8 below.

Example 54

An ISO versatile dumbbell test piece, a disc test piece, a cell tap test piece, and a test piece for UL94 V test are prepared in the same manners as in Example 41, except that 1 part by mass of the lignophenol compound and 20 parts by mass of the aliphatic polyester compound, used in Example 41 are previously kneaded with a kneading machine (Laboplast Mill, a product of Toyo Seiki Seisaku-Sho, Ltd.) to obtain a masterbatch, and the masterbatch is injection molded under the same conditions as in Example 41, and measurement of Charpy impact strength and cell tap strength, and evaluation of flame retardancy are conducted in the same manners as in Example 41. The results obtained are shown in Table 8 below.

Example 55

An ISO versatile dumbbell test piece, a disc test piece, a cell tap test piece, and a test piece for UL94 V test are prepared in the same manners as in Example 41, except that the mold temperature is 50° C., and measurement of Charpy impact strength and cell tap strength, and evaluation of flame retardancy are conducted in the same manners as in Example 41. The results obtained are shown in Table 8 below.

Comparative Example 9

An ISO versatile dumbbell test piece, a disc test piece, a cell tap test piece, and a test piece for UL94 V test are prepared in the same manners as in Example 41, except that a commercially available resin material comprising a polylactic acid and a polycarbonate as main components (trade name "Ecodia V554R10", a product of Tray Industries, Inc.) is used in place of the lignophenol compound and the aliphatic polyester resin, used in Example 41 is injection molded at a cylinder temperature of 230° C. and a mold temperature of 50° C., and measurement of Charpy impact strength and cell tap strength, and evaluation of flame retardancy are conducted in the same manners as in Example 41. The results obtained are shown in Table 8 below.

Comparative Example 10

An ISO versatile dumbbell test piece, a disc test piece, a cell tap test piece, and a test piece for UL94 V test are prepared in the same manners as in Example 41, except that a commercially available masterbatch comprising a polylactic acid and a nanoclay as main components (trade name "TE-8300", a product of Unitika, Ltd.) is used in place of the lignophenol compound and the aliphatic polyester resin, used in Example 41 is injection molded under the same conditions as in Example 41, and measurement of Charpy impact strength and cell tap strength, and evaluation of flame retardancy are conducted in the same manners as in Example 41. The results obtained are shown in Table 8 below.

TABLE 8

| | Charpy impact strength (kJ/m²) | Cell tap strength | Flame retardancy (UL94-V test) |
|---|---|---|---|
| Example 41 | 3.4 | Good | V-2 |
| Example 42 | 3.1 | Good | V-2 |
| Example 43 | 3.2 | Good | V-2 |
| Example 44 | 3.3 | Good | V-2 |
| Example 45 | 3.3 | Good | V-2 |
| Example 46 | 3.2 | Good | V-2 |
| Example 47 | 3.3 | Good | V-2 |
| Example 48 | 3.6 | Good | V-2 |
| Example 49 | 3.2 | Good | V-2 |
| Example 50 | 3.4 | Good | V-2 |
| Example 51 | 3.0 | Good | V-0 |
| Example 52 | 3.5 | Good | V-0 |
| Example 53 | 3.4 | Good | V-0 |
| Example 54 | 3.5 | Good | V-2 |
| Example 55 | 3.3 | Good | V-2 |
| Comparative Example 9 | 2.7 | Crack occurred in Boss | V-0 |
| Comparative Example 10 | 1.4 | Breakage occurred in boss | Not |

As shown in Table 8, it is confirmed that the resin moldings obtained in Examples 41 to 55 have high impact strength, cell tap strength and flame retardancy as compared with the resin moldings obtained in Comparative Examples 9 and 10.

Examples 56 to 70

Front covers of Examples 56 to 70 for a color multifunction machine (DocuCenter 500, a product of Fuji Xerox Co., Ltd.) are prepared in the same manners as in Examples 41 to 55, respectively. An ISO versatile dumbbell test piece and a UL test piece are cut off from each of the front covers obtained (the same each test piece obtained in Examples 41 to 55, except that the thickness of the test piece is 2.4 mm), and the same evaluations are conducted. Further, an ISO versatile dumbbell test piece is cut off from each of the front covers obtained after recycling 5 times, and its Charpy impact strength is measured. Then retention of Charpy impact strength after recycling 5 times is obtained by comparing the Charpy impact strength after recycling 5 times with Charpy impact strength before recycling. The results obtained are shown in Table 9 below.

Comparative Examples 11 and 12

Front covers of Comparative Examples 11 and 12 for a color multifunction machine (DocuCenter 500, a product of Fuji Xerox Co., Ltd.) are prepared in the same manners as in Comparative Examples 9 and 10, respectively, and Charpy impact strength and flame retardancy are measured or evaluated in the same manners as in Examples 56 to 70. Further, an ISO versatile dumbbell test piece is cut off from each of the front covers obtained after recycling 5 times, and its Charpy impact strength is measured. Then retention of Charpy impact strength after recycling 5 times is obtained by comparing the Charpy impact strength after recycling 5 times with Charpy impact strength before recycling. The results obtained are shown in Table 9 below.

TABLE 9

| | Charpy impact strength (kJ/m²) | Flame retardancy (UL94-test) | Retention of Charpy impact strength after recycling 5 times (%) |
|---|---|---|---|
| Example 56 | 2.7 | V-2 | 100 |
| Example 57 | 2.6 | V-2 | 100 |
| Example 58 | 2.6 | V-2 | 100 |
| Example 59 | 2.4 | V-2 | 100 |
| Example 60 | 2.9 | V-2 | 100 |
| Example 61 | 2.7 | V-2 | 100 |
| Example 62 | 2.6 | V-2 | 100 |
| Example 63 | 2.6 | V-2 | 100 |
| Example 64 | 2.7 | V-2 | 100 |
| Example 65 | 2.5 | V-2 | 100 |
| Example 66 | 2.5 | V-0 | 95 |
| Example 67 | 2.7 | V-0 | 99 |
| Example 68 | 2.6 | V-0 | 97 |
| Example 69 | 2.9 | V-2 | 100 |
| Example 70 | 2.7 | V-2 | 98 |
| Comparative Example 11 | 1.7 | V-0 | 65 |
| Comparative Example 12 | 0.9 | Not | 60 |

As shown in Table 9, it is confirmed that the front covers obtained in Examples 56 to 70 have high impact strength and extremely high recycling efficiency as compared with the front covers obtained in Comparative Examples 11 and 12.

The resin composition according to the present invention makes it possible to produce a resin molding having excellent biomass content, and further having sufficiently high impact strength and heat resistance by using an aliphatic polyester resin and a lignophenol compound in combination. Further, use of the resin composition of the present invention can sufficiently improve properties such as oxidation resistance, heat resistance, surface hardness, abrasion resistance, weather resistance and recycling efficiency of the resin molding obtained. Additionally, because the aliphatic polyester compound and the lignophenol compound each are a biomass material, even if the content of, for example, the lignophenol is increased, the biomass content does not decrease. Thus, the resin composition of the present invention is advantageous even in the point that degree of freedom of design can be enlarged.

Where the aliphatic polyester compound and the lignophenol compound each are used alone, impact strength is poor. Further, use of the aliphatic polyester compound alone results in poor heat resistance and oxidation resistance, and on the other hand, use of the lignophenol compound alone involves the problems that the life of oxidation resistance is limitative, and surface hardness deteriorates with using. Thus, it is said that the above effect obtained by combining the aliphatic polyester compound and the lignophenol compound, each not always having excellent properties alone, is extremely unexpected result.

The reason that the above effect is obtained by the resin composition of the present invention is not always clarified, but the present inventors presume as follows. That is, by combining the aliphatic polyester compound and the lignophenol compound, the aliphatic polyester compound is arranged in an appropriate molecular size to a network of the lignophenol compound, a terminal group of the aliphatic polyester compound and a predetermined functional group (such as hydroxyl group) of the lignophenol compound are bonded, and a coordinate bond is formed between a carbonyl group of the aliphatic polyester compound and an aromatic ring of the lignophenol compound. Due to this, it is considered that both impact strength and heat resistance are markedly improved in the resin molding obtained.

In the resin composition of the present invention, the aliphatic polyester compound is preferably a polylactic acid. Use of the polylactic acid makes it possible to produce a resin molding having sufficiently high biomass content and further having sufficiently high mechanical strength and heat resistance further surely.

When the resin composition (A) is injection molded under the ordinary molding conditions, the composition is crystallized extremely rapidly. This is an unexpected effect. The reason for this is not clarified, but the present inventors presume as follows. The lignophenol compound having the structure of the formula (2) and having an average molecular weight of from 30,000 to 200,000 in terms of a polystyrene conversion has a very rigid structure, and is therefore primary-oriented regularly when fluidizing. By such a primary orientation of the lignophenol compound, orientation of the polyester compound having the structure of the formula (3) that inherently has slow crystallization is accelerated, and as a result, crystallization of the resin composition is accelerated. Further, the fact that reaction with the aliphatic polyester compound is suppressed by capping a free hydroxyl group of the lignophenol compound as shown in the formula (2) is considered to be one factor that crystallization is accelerated when injection molding.

According to the resin composition (A), oxidation resistance of the resin molding obtained can further be improved. This is considered to be that reaction with the aliphatic polyester compound is suppressed by capping a free hydroxyl group of the lignophenol compound, and the lignophenol compound exhibits a function as an antioxidant. Further, because the lignophenol compound does not have unreacted sites, the effect of not adversely affecting flame retardancy is developed.

The resin composition (A) is preferably that $Mw_a/Mw_b$ is from 0.1 to 50 when weight average molecular weights of the lignophenol compound and the aliphatic polyester compound in terms of a polystyrene conversion are $Mw_a$ and $Mw_b$, respectively. When $Mw_a/Mw_b$ is set to the above specific range, compatibility between the lignophenol compound and the aliphatic polyester compound, and crystallization accelerating effect can sufficiently be improved in good balance.

According to the resin composition (B), impact strength of the resin molding obtained can further be improved. The reason for this is not clarified, but the present inventors presume as follows. The lignophenol compound having the structure represented by the formula (4) and having a molecular weight of from 200 to 3,000 has a role as a plasticizer. Further, the lignophenol compound has reactive functional groups as shown in the formula (4). Therefore, when a part of the reactive functional groups is reacted with the aliphatic polyester compound having the structure represented by the formula (3), it acts as a crosslinking agent, and as a result, uniform dispersibility is increased. Thus, the present inventors presume that impact strength of the resin molding obtained can further be improved by the functions of the lignophenol compound as a plasticizer and/or a crosslinking agent.

Further, it is considered that when the lignophenol compound and the polyester compound are reacted, the terminals of the aliphatic polyester compound are capped, thereby developing the hydrolysis suppression effect. Therefore, it is said that the resin composition (B) is an extremely excellent composition in the point of recycling efficiency.

The resin composition (B) is preferably that $Mw_c/Mw_b$ is from 0.001 to 0.1 when weight average molecular weights of the lignophenol compound and the aliphatic polyester compound in terms of a polystyrene conversion are $Mw_c$ and $Mw_b$, respectively. When $Mw_c/Mw_b$ is set to the above specific range, the functions of the lignophenol compound as a plasticizer and/or a crosslinking agent can sufficiently and surely be exhibited.

The resin composition (B) is preferably that a chemical bond is formed between the lignophenol compound and the aliphatic polyester compound. This can further increase the functions of the lignophenol compound as a plasticizer and/or a crosslinking agent.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A resin composition, which comprises:
   an aliphatic polyester compound; and
   a lignophenol compound,
   wherein the lignophenol compound has a structure represented by formula (1):

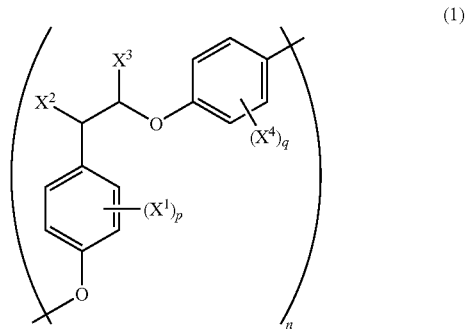

(1)

wherein $X^1$ and $X^4$ each independently represents a hydrogen atom, an alkyl group, an aryl group, an alkoxy group, an aralkyl group or a phenoxy group;
   $X^2$ represents a hydrogen atom, an alkyl group, an aryl group, an alky-substituted aryl group, an alkoxy group or a phenoxy group;
   $X^3$ represents an alkyl group, an aryl group, an alkyl-substituted aryl group or $-OX^5$ wherein $X^5$ represents a hydrogen atom, an alkyl group or an aryl group;
   $X^1$ to $X^5$ other than a hydrogen atom each may have a substituent;
   p and q each independently represents an integer of from 1 to 4; and
   n represents an integer of 1 or more.

2. The resin composition according to claim 1,
   wherein the aliphatic polyester compound is a polylactic acid.

3. The resin composition according to claim 1,
   wherein the lignophenol compound is a compound having a structure represented by formula (2), and having an average molecular weight of from 30,000 to 200,000 in terms of a polystyrene conversion, and the aliphatic polyester compound has a structure represented by formula (3):

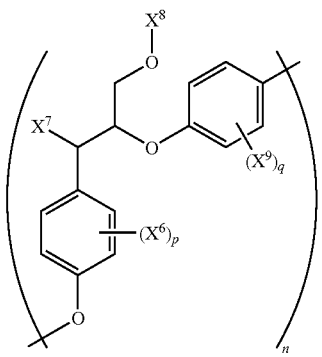

(2)

wherein $X^6$, $X^7$ and $X^9$ each independently represents a hydrogen atom, an alkoxy group, an aryl group or a phenoxy group;
$X^8$ represents an alkyl group or an aryl group;
$X^6$ $X^9$ other than a hydrogen atom each may have a substituent;
p and q each independently represents an integer of from 1 to 4; and
n represents an integer of from 1 to 2,000;

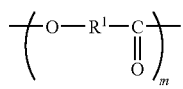

(3)

wherein $R^1$ represents a linear or branched alkylene group; and
m represents an integer of 1 or more.

4. The resin composition according to claim 3,
wherein $Mw_a/Mw_b$ is from 0.1 to 50 when weight average molecular weights of the lignophenol compound and the aliphatic polyester compound in terms of a polystyrene conversion are $Mw_a$ and $Mw_b$, respectively.

5. The resin composition according to claim 1,
wherein the lignophenol compound is a compound having a structure represented by formula (4), and having an average molecular weight of from 200 to 3,000 in terms of a polystyrene conversion, and
the aliphatic polyester compound has a structure represented by formula (3):

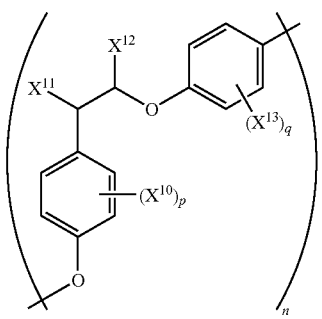

(4)

wherein $X^{10}$ and $X^{13}$, which may have a substituent, each independently represents an alkyl group, an aryl group or an alkoxy group;
$X^{11}$ and $X^{12}$ each independently represents an alkyl group, an aryl group, an alkyl-substituted aryl group or a group of an alkyl group, an aryl group or an alkyl-substituted aryl group each having a hydroxyl group, a carboxylic acid group or a carboxylic acid derivative group bonded thereto as a substituent;
p and q each independently represents an integer of from 1 to 4; and
n represents an integer of from 1 to 10;

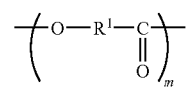

(3)

wherein $R^1$ represents a linear or branched alkylene group; and
m represents an integer of 1 or more.

6. The resin composition according to claim 5,
wherein $Mw_c/Mw_b$ is from 0.00 1 to 0.1 when weight average molecular weights of the lignophenol compound and the aliphatic polyester compound in terms of a polystyrene conversion are $Mw_c$ and $Mw_b$, respectively.

7. The resin composition according to claim 5,
wherein a chemical bond is formed between the lignophenol compound and the aliphatic polyester compound.

8. A resin molding, which comprises:
an aliphatic polyester compound; and
a lignophenol compound,
wherein the lignophenol compound has a structure represented by formula (1):

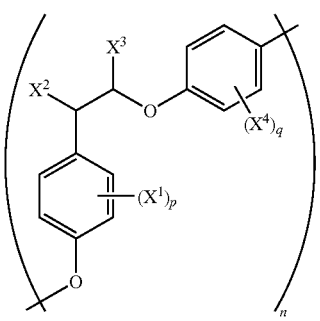

(1)

wherein $X^1$ and $X^4$ each independently represents a hydrogen atom, an alkyl group, an aryl group, an alkoxy group, an aralkyl group or a phenoxy group;
$X^2$ represents a hydrogen atom, an alkyl group, an aryl group, an alkyl-substituted aryl group, an alkoxy group or a phenoxy group;
$X^3$ represents an alkyl group, an aryl group, an alkyl-substituted aryl group or —$OX^5$ wherein $X^5$ represents a hydrogen atom, an alkyl group or an aryl group;
to $X^1$ $X^5$ other than a hydrogen atom each may have a substituent;
p and g each independently represents an integer of from 1 to 4: and
n represents an integer of 1 or more.

9. The resin molding according to claim 8,
wherein the aliphatic polyester compound is a polylactic acid.

10. The resin molding according to claim 8,
wherein the lignophenol compound is a compound having a structure represented by formula (2), and having an average molecular weight of from 30,000 to 200,000 in terms of a polystyrene conversion, and the aliphatic polyester compound has a structure represented by formula (3):

(2)

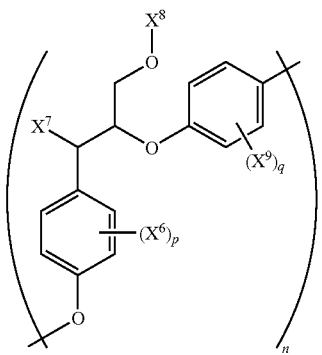

wherein $X^6$, $X^7$ and $X^9$ each independently represents a hydrogen atom, an alkoxy group, an aryl group or a phenoxy group;
$X^8$ represents an alkyl group or an aryl group;
$X^6$ $X^9$ other than a hydrogen atom each may have a substituent;
p and q each independently represents an integer of from 1 to 4; and
n represents an integer of from 1 to 2,000;

(3)

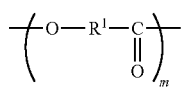

wherein $R^1$ represents a linear or branched alkylene group; and
m represents an integer of 1 or more.

11. The resin molding according to claim 8,
wherein $Mw_a/Mw_b$ is from 0.1 to 50 when weight average molecular weights of the lignophenol compound and the aliphatic polyester compound in terms of a polystyrene conversion are $Mw_a$ and $Mw_b$, respectively.

12. The resin molding according to claim 8,
wherein the lignophenol compound is a compound having a structure represented by formula (4), and having an average molecular weight of from 200 to 3,000 in terms of a polystyrene conversion, and
the aliphatic polyester compound has a structure represented by formula (3):

(4)

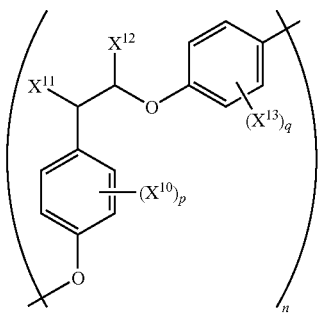

wherein $X^{10}$ and $X^{13}$, which may have a substituent, each independently represents an alkyl group, an aryl group or an alkoxy group;
$X^{11}$ and $X^{12}$ each independently represents an alkyl group, an aryl group, an alkyl-substituted aryl group or a group of an alkyl group, an aryl group or an alkyl-substituted aryl group each having a hydroxyl group, a carboxylic acid group or a carboxylic acid derivative group bonded thereto as a substituent;
p and q each independently represents an integer of from 1 to 4; and
n represents an integer of from 1 to 10;

(3)

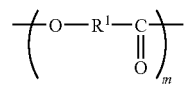

wherein $R^1$ represents a linear or branched alkylene group; and
m represents an integer of 1 or more.

13. The resin molding according to claim 12,
wherein $Mw_c/Mw_b$ is from 0.001 to 0.1 when weight average molecular weights of the lignophenol compound and the aliphatic polyester compound in terms of a polystyrene conversion are $Mw_c$ and $Mw_b$, respectively.

14. The resin molding according to claim 12,
wherein a chemical bond is formed between the lignophenol compound and the aliphatic polyester compound.

15. A resin molding, which partially or wholly comprises a resin molding obtained by molding a resin composition according to claim 1.

16. A production method of a resin molding, the method comprising:
kneading a lignophenol compound and an aliphatic polyester compound, so as to form a mixture; and then
injection molding the mixture as it is, and
wherein the lignophenol compound has a structure represented by formula (1):

(1)

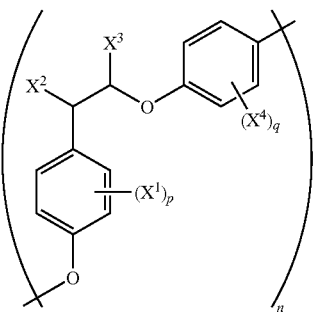

wherein $X^1$ and $X^4$ each independently represents a hydrogen atom, an alkyl group, an aryl group, an alkoxy group, an aralkyl group or a phenoxy group:
$X^2$ represents a hydrogen atom, an alkyl group, an aryl group, an alkyl-substituted aryl group, an alkoxy group or a phenoxy group;
$X^3$ represents an alkyl group, an aryl group, an alkyl-substituted aryl group or —$OX^5$ wherein $X^5$ represents a hydrogen atom, an alkyl group or an aryl group;
$X^1$ $X^5$ other than a hydrogen atom each may have a substituent;
p and q each independently represents an integer of from 1 to 4; and
n represents an integer of 1 or more.

17. A recycling method of a resin molding, the method comprising:
grinding a resin molding according to claim 8, as to form a ground resin molding; and then
injection molding the ground resin molding as it is.

* * * * *